United States Patent [19]

Meisenheimer, Jr.

[11] 4,376,445
[45] Mar. 15, 1983

[54] SELF-CLOSING BREAKAWAY VALVE ASSEMBLY INCLUDING IMPROVED VALVE MOUNTING WITH ROTATION LIMITING STOP

[76] Inventor: Daniel T. Meisenheimer, Jr., 404 Longmeadow, Orange, Conn. 06477

[21] Appl. No.: 287,430

[22] Filed: Jul. 27, 1981

Related U.S. Application Data

[62] Division of Ser. No. 10,745, Feb. 9, 1979, Pat. No. 4,301,823.

[51] Int. Cl.³ .............................................. F16K 17/40
[52] U.S. Cl. .................................... 137/68 R; 137/75; 137/614.02; 251/288; 251/313
[58] Field of Search ................... 137/68 R, 75, 614.02; 251/285, 286, 287, 288, 313; 285/2

[56] References Cited

U.S. PATENT DOCUMENTS 3,687,414 8/1972 Petty ................................ 251/288 X
3,827,671 8/1974 Bolden ................................ 251/288
3,921,656 11/1975 Meisenheimer ................... 137/68 R Primary Examiner—Harold W. Weakley
Attorney, Agent, or Firm—Cifelli, Frederick & Tully

[57] ABSTRACT

Improved valve mountings with rotational limiting stops for self-closing breakaway valve assemblies comprising two frangibly connected valve housings each having a rotatable valve member and trigger means holding the valve members open until the valve housings separate. The rotatable valve members have slotted trunnion shafts respectively rotatably received in trunnion bearings mounted to the valve housings. A coil spring is deployed about each trunnion shaft and has one tang end received in the slot of the trunnion shaft to bias the rotatable valve member to its closed position. Indicator shafts keyed with the trunnion shafts are rotatably mounted in the trunnion bearings, the ends of the indicator shafts being exposed to indicate the positions of the valve members. In one embodiment, a key extends from each trunnion shaft or indicator shaft into an arcuate slot in the trunnion bearing, and the keys ground against stop surfaces of the arcuate slots to limit rotation of the valve members beyond their closed positions. In another embodiment, the tang ends of the springs adjacent the trunnion shafts are received in arcuate slots in the trunnion bearings, and the spring tang ends ground against stop surfaces of the arcuate slots to limit rotation of the valve members beyond their closed positions.

11 Claims, 7 Drawing Figures

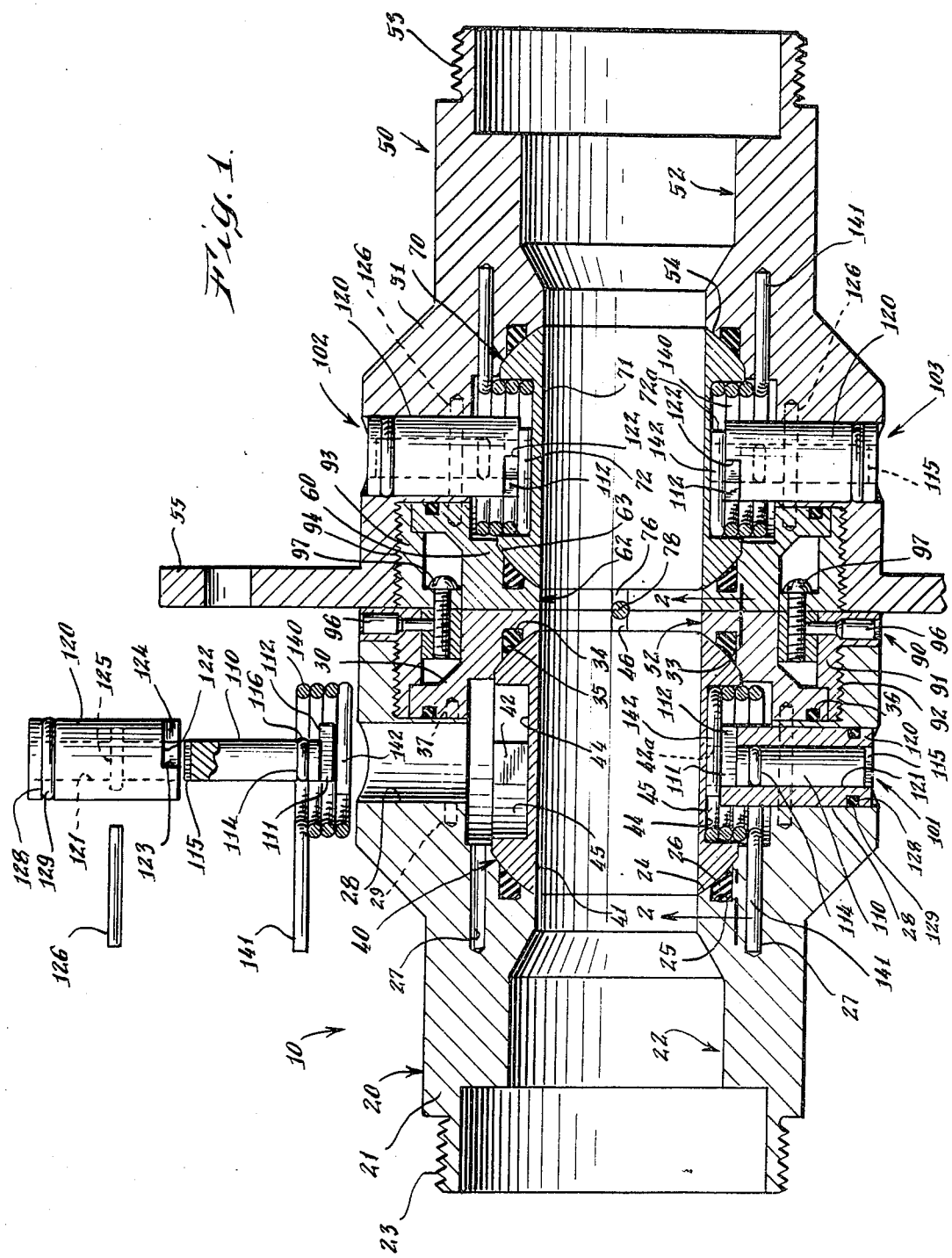

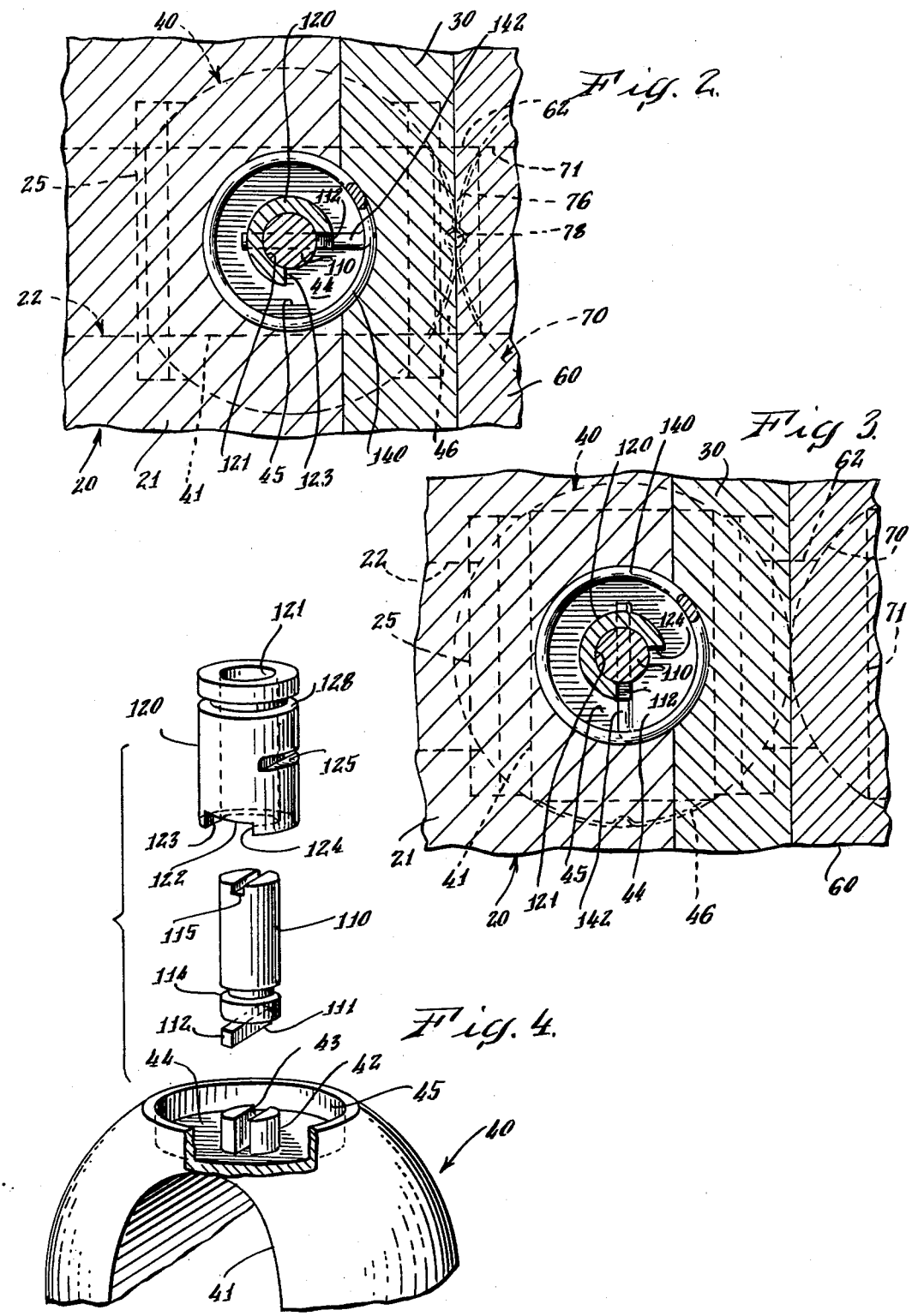

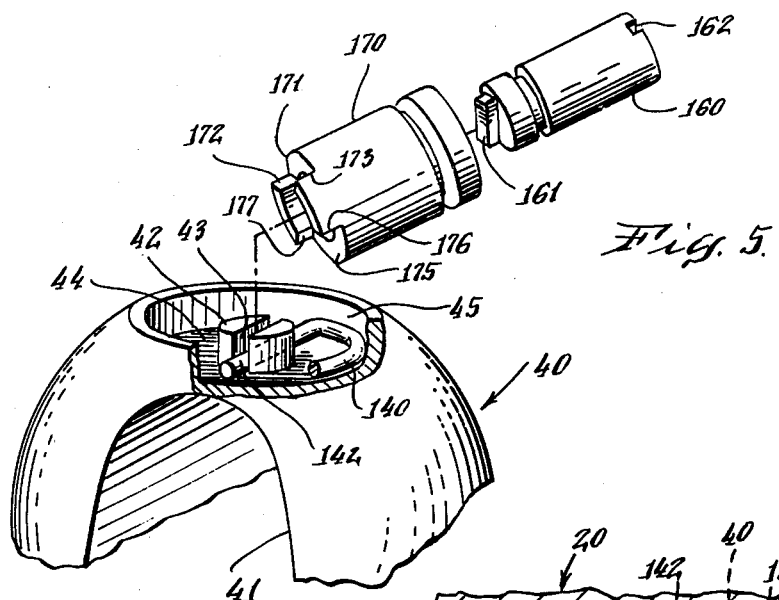
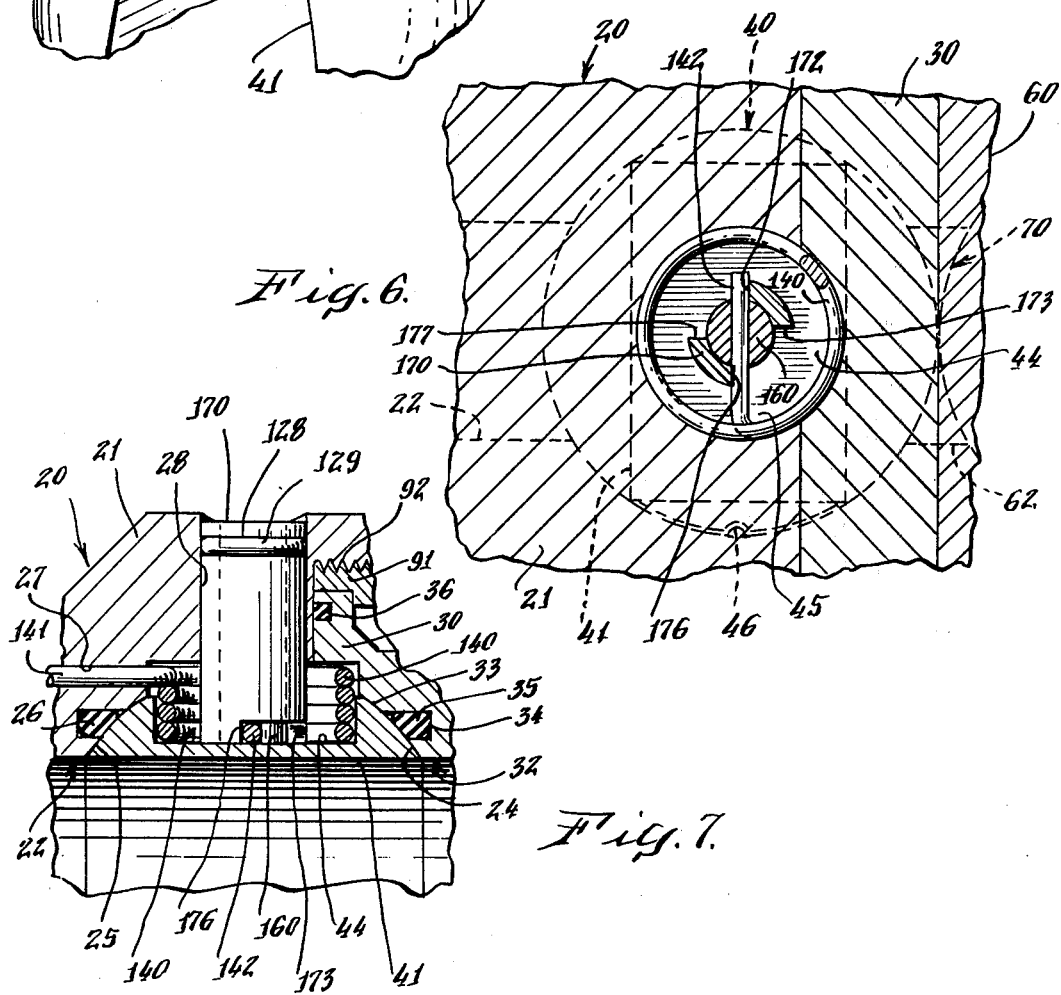

SELF-CLOSING BREAKAWAY VALVE ASSEMBLY INCLUDING IMPROVED VALVE MOUNTING WITH ROTATION LIMITING STOP

This is a division of application Ser. No. 10,745, filed Feb. 9, 1979, now U.S. Pat. No. 4,301,823.

BACKGROUND OF THE INVENTION

This invention relates to a self-closing breakaway valve assembly including improved valve mounting with rotation limiting stop.

Self-closing breakaway valve assemblies are disclosed in U.S. Pat. No. 3,921,656. Very generally, a self-closing breakaway valve assembly is comprised of two frangibly connected valve housings each having a valve member rotatably mounted therein. The valve members and the valve housings each have a bore formed therethrough, and when the rotatable valve members are in their open positions, the bores of the valve members and valve housings are aligned to provide a passage through the self-closing breakaway valve assembly. The valve members are each spring biased to a closed position, i.e. a spring rotates the valve member to misalign the bore of the valve member with the bore of the valve housing in which it is mounted to block the passage therethrough. The valve housings are connected by frangible means and the rotatable valve members are held open by interposed trigger means. The trigger means releases upon separation of the valve housings to permit the rotatable valve members to close.

Each rotatable valve member is mounted on aligned pivot axis shafts, one end of each shaft being secured in the rotatable valve member and the other end of the shaft being rotatably received in an opening in the valve housing. The spring bias is provided by a spring coiled about the shaft and having one end thereof secured to the valve housing and the other end thereof bearing on a pin also mounted to the rotatable valve member at a point spaced apart from the pivot axis shaft. When the rotatable valve member is released to close, the spring acts on the ball through the pin to rotate it to its closed position, and the pin grounds against a shoulder of the housing to limit rotation of the valve member and hold it in its closed position.

With reference to my copending application, Ser. No. 900,329, filed Apr. 25, 1978, there is disclosed a frangible connector for the two valve housings of a self-closing breakaway valve assembly, wherein the load at which the valve housings separate may be selected independently in the tension and bending modes.

In both U.S. Pat. No. 3,921,656 and copending application Ser. No. 900,329, it is pointed out that a self-closing breakaway valve may comprise a single valve housing having a valve member rotatably mounted therein wherein the single valve housing is frangibly connected to an additional housing member which does not contain a rotatable valve member. This alternative is useful where it is only required to seal on one side of the two housing members upon separation thereof.

SUMMARY OF THE INVENTION

It is a principal object of the invention herein to provide a self-closing breakaway valve assembly incorporating an improved ball valve mounting with a rotation limiting stop.

It is an additional object of the invention herein to provide a self-closing breakaway valve assembly incorporating an improved ball valve mounting with rotation limiting stop which is compact.

It is a further object of the invention herein to provide a self-closing breakaway valve assembly incorporating an improved ball valve mounting with rotation limiting stop which is sealed against fluid loss.

It is another object of the invention herein to provide a self-closing breakaway valve assembly incorporating an improved ball valve mounting with rotation limiting stop which is easily assembled.

It is yet another object of the invention herein to provide a self-closing breakaway valve assembly incorporating an improved ball valve mounting with rotation limiting stop wherein an indication of whether the ball valve is open or closed is provided.

It is still a further object of the invention herein to provide a self-closing breakaway valve assembly incorporating an improved ball valve mounting with rotation limiting stop which is strong and reliable.

According to the invention herein, a self-closing breakaway valve assembly generally comprises two frangibly connected housings at least one of which has a valve member rotatably mounted therein by an improved valve mounting with stops for limiting rotation of the valve member between open and closed positions. The rotatable valve member has trunnion stub shafts aligned along its desired pivot axis, and at least one of the trunnion stub shafts defines a slot receiving the tang of a spring biasing the rotatable valve member to its closed position. The other trunnion stub shaft also preferably defines a slot receiving the tang of another spring wherein both springs bias the rotatable valve member to its closed position.

The improved ball valve mounting with rotation limiting stops includes a cylindrical trunnion bearing for each trunnion shaft of the rotatable valve member, the trunnion bearings being fixedly mounted in the valve housing and pivotally receiving the trunnion shafts to rotatably mount the valve member. Each trunnion bearing defines an arcuate slot having an end stop surface. Each trunnion bearing rotatably receives an indicator shaft having a key received in the slot of the associated trunnion shaft, so that the indicator shaft and trunnion shafts rotate together with the valve member. A key extends radially from either the trunnion shaft or the indicator shaft into the arcuate slot in the trunnion bearing, and in the preferred embodiment the key which secures the trunnion shaft to the indicator shaft also extends into the arcuate slot of the trunnion bearing.

The key grounds against the stop surface at the end of the arcuate slot to limit rotation of the valve member. In particular, when the valve member is released for closing upon separation of the frangibly connected housings, it rotates under spring bias until the key grounds against the stop of the arcuate slot, thereby limiting further rotation of the valve member and holding the valve member in its closed position. Both housings of the self-closing breakaway valve assembly may comprise rotatable valve members mounted as described above, wherein both rotatable valve members close upon separation of the housings.

In an alternative structure, also according to the invention herein, the spring tang is received in the arcuate slot of the trunnion bearing wherein the spring tang butts against the stop surface at the end of the arcuate slot in the trunnion bearing to limit rotation of the valve member.

The indicator shaft preferably includes a slot at its end opposite the key, the slot indicating the position of the rotatable valve member. O-seals may be provided between the shaft and the trunnion bearing and between the trunnion bearing and the housing to prevent leakage.

Other and more specific objects and features of the invention herein will in part be obvious and will in part appear from a perusal of the following description of the preferred embodiment and the claims, taken together with the drawings.

DRAWINGS

FIG. 1 is a sectional view, partially exploded, of a self-closing breakaway valve assembly including ball valves mounted by the improved ball valve mounting with rotation limiting stop according to the invention herein;

FIG. 2 is a fragmentary sectional view of the self-closing breakaway valve assembly of FIG. 1 and the improved ball valve mounting with rotation limiting stop incorporated therein, taken along the lines 2—2 of FIG. 1;

FIG. 3 is a view similar to FIG. 2 except that the ball valve member is rotated to its closed position;

FIG. 4 is an exploded perspective view of the improved ball valve mounting with rotation limiting stop and a ball valve member mounted thereby;

FIG. 5 is an exploded perspective view of an alternative ball valve mounting with rotation limiting stop and a ball valve member mounted thereby;

FIG. 6 is a sectional view, similar to FIG. 3, of the alternative ball valve mounting with rotation limiting stop and ball valve mounted thereby of FIG. 5; and FIG. 7 is a side elevation view of the alternative ball valve mounting with rotation limiting stop and ball valve mounted thereby of FIG. 5.

The same reference numerals refer to the same elements throughout the various Figures.

DESCRIPTION OF PREFERRED EMBODIMENT

With reference to FIG. 1, a self-closing breakaway valve assembly 10 incorporates improved mountings 100–103 for the rotatable valve members thereof, the valve mountings 100–103 providing rotation limiting stops for limiting rotational movement of the valve members beyond a closed position, all according to the invention herein.

The self-closing breakaway assembly 10 comprises two valve housings 20 and 50 having rotatable valve members 40 and 70, respectively, and the valve members 40 and 70 are preferably generally spherical "ball" valve members. The valve housings 20 and 50 are joined together by a frangible connector assembly 90.

The valve housing 20 has a very generally tubular base 21 forming a bore 22 therethrough. The end of the base 21 is threaded at 23 for connecting a fuel line or the like. The base 21 defines a partial spherical surface 24 which rotatably receives the ball valve member 40 and an annular groove 25 receives an O-seal 26 to provide sealing between the base 21 and the ball valve member 40. The housing 20 further comprises a ball retainer 30 which is clamped to the base 21 by a tension ring 91 of the frangible connector assembly 90, the tension ring 91 threading into the base 21 of the housing 20 as indicated at 92. The ball retainer 30 also defines a bore 32, which is aligned with the bore 22 of the base 21 to provide a passage through the valve housing 20. The ball retainer 30 has a partial spherical surface 33, opposite the partial spherical surface 24 of the base 21, and the spherical surface 33 also rotatably receives the ball valve member 40. An annular groove 34 receiving O-seal 35 provides sealing between the ball valve member 40 and the ball retainer 30 and an O-seal 36 also provides sealing between the base 21 and the ball retainer 30.

The other valve housing 50 is similar to the valve housing 20 described above, comprising a base 51 having a bore 52 formed therethrough and defining a partial spherical surface 54 for rotatably receiving the ball valve member 70. The housing 50 further comprises a ball retainer 60 also defining a partial spherical surface 63 rotatably receiving the ball valve member 70 and defining a bore 62 which is aligned with the bore 32 of the ball retainer 30 when the valve housings 20 and 50 are assembled together. The ball retainer 60 is clamped to the base 51 by the bending ring 93 of the frangible connector assembly 90, which threads into the base 51 as indicated at 94. The base 51 is threaded at 53 for attaching a fuel line or the like. The base 51 of housing 50 may be provided with a radially extending flange 55 for attaching the assembled self-closing breakaway valve assembly 10 to a bulkhead or the like in an aircraft, in which it is particularly useful.

The ball valve members 40 and 70 are rotatably received in the valve housings 20 and 50, respectively. More particularly, the ball valve member 40 defines a bore 41 therethrough, and the ball valve member 70 defines a bore 71 therethrough, and the ball valve members 40 and 70 are rotatably mounted such that they have an open position with their bores 41 and 71 aligned with each other and with the bores through the valve housings 20 and 50 to provide for the flow of fuel or other liquid through the self-closing breakaway valve assembly 10, as illustrated in FIGS. 1 and 2. The ball valve members 40 and 70 are each rotatable from their open position to a closed position, best illustrated in FIG. 3 with respect to ball valve member 40, wherein the bores 41 and 71 of the ball valve members 40 and 70 are misaligned with the bores through their respective housings 20 and 50 to block the flow of fuel or other liquid therethrough. The pivotal mounting of the ball valve members 40 and 70 is accomplished by the improved ball valve mountings with rotation limiting stops 100–103, according to the invention herein.

With reference to FIGS. 1 and 4, the ball valve member 40 includes a first trunnion stub shaft 42 defining a slot 43 therethrough, the slot 43 preferably being aligned with the bore 41 of the ball valve member 40. The trunnion stub shaft has its axis along the desired pivot axis of the ball valve member 40, which is perpendicular to the axis of the bore 41 through the ball valve member 40. The ball valve member 40 is preferably truncated and has a flat recessed surface 44 from which the trunnion stub shaft 42 protrudes, and an annular space 45 is defined surrounding the trunnion stub shaft 42. The coils of a coil spring 140 are received in the annular space 45, and one tang end 141 of the coil spring 140 is received in an opening 27 formed in the base 21 of the housing 20. The other tang end 142 of the coil spring 140 is angled to lie along the diameter of the coils and is inserted in the slot 43 of the trunnion stub shaft 42 of the ball. The coil spring 140 is tensioned so that it biases the ball valve member 40 for rotation.

The ball valve mounting 100 comprises an indicator shaft 110, which is generally cylindrical and is provided with a key 111 on the bottom thereof. The key 111 extends radially from the shaft 110, as indicated at 112. The key 111 is preferably integral with the shaft 110, but may be a separate key received in a slot in the end of the shaft 110 if desired. The shaft 110 further preferably defines a slot 115 on its end opposite the key 111, the slot 115 being aligned with the key 111, and an annular groove 114 receiving an O-seal 116. The key 111 is partially received in the slot 43 of the trunnion stub shaft 42, above the spring tang 142 and with the key portion 112 extending radially from the slot 43, wherein the ball valve member 40 and the shaft 110 rotate together.

A trunnion bearing 120 is generally cylindrical and defines an opening 121 therethrough. The trunnion bearing 120 further defines an arcuate slot 122 at the lower end thereof, the arcuate slot 122 extending between surfaces 123 and 124, surface 123 comprising a stop as will be more fully explained below. The arcuate slot 122 extends about slightly more than 90 degrees of the bottom of the trunnion bearing 120. The trunnion bearing 120 receives the indicator shaft 110 in its central opening 121, and the trunnion bearing itself is received in a cylindrical opening 28 in the base 21 of the valve housing 20. The trunnion bearing 120 is anchored in the opening 28 of the valve housing 120 by providing the trunnion bearing with a slot 125 which accommodates a pin 126. One end of the pin 126 is received in an opening 29 in the base 21 of the valve housing 20, and the other end of the pin 126 is accommodated in an opening 37 in the ball retainer 30. The trunnion bearing defines an annular groove 128 receiving an O-seal 129 for sealing the trunnion bearing to the valve housing.

The extending portion 112 of the key 111 is received in the arcuate slot 122 of the trunnion bearing, and thus the end surfaces 123 and 124 limit rotation of the shaft 110 to approximately 90 degrees with respect to the trunnion bearing 120. The trunnion bearing is positioned such that the surface 123 of the arcuate slot 122 provides a closed stop for the ball valve member 40, and surface 124 may provide an open stop, if desired. More particularly, when the extending portion 112 of the key 111 of the shaft 110 is grounded against or adjacent the stop surface 124, as best seen in FIG. 2, the ball valve member 40 is in its open position, i.e. its bore 41 is aligned with the bores in the base 21 and the ball retainer 30 of the valve housing 20, thereby providing a through passage for fuel or other liquids through the valve housing 20. When the extending portion 112 of key 111 is grounded against the stop surface 123, the ball valve member 40 has rotated approximately 90 degrees to the position shown in FIG. 3, and the ball valve member 40 is in its closed position, i.e. its bore 41 is misaligned with the bores through the base and ball retainer of the valve housing, thereby prohibiting the flow of fuel and the like through the valve housing.

The ball valve member 40 has a second trunnion stub shaft 42a located along the pivot axis of the ball valve member 40 and opposite the first trunnion stub shaft 42. The second trunnion stub shaft 42a is mounted by the ball valve mounting 101, which is identical to the ball valve mounting 100 described above. Inasmuch as the elements are identical, they have been given the same numbers. It will be appreciated that the stop surfaces of the ball valve mounting 101 are oriented to act together with the stop surfaces of ball valve mounting 100.

The ball valve member 70 is rotatably mounted in the valve housing 50 by ball valve mountings 102 and 103, which respectively receive trunnion stub shafts 72 and 72a of the ball valve member 70. Again, the elements of the ball valve mountings 102 and 103 are identical with the elements of the ball valve mounting 100. The ball valve mountings 102 and 103 thereby also limit the rotation of the ball valve member 70 to between its open and closed positions, as described above with respect to ball valve member 40.

The valve housings 20 and 50 are secured together by the frangible connector assembly 90, which includes the tension ring 91 threaded into the base 21 of valve housing 20 and the bending ring 93 threaded into the base 51 of valve housing 50. The frangible connector assembly further comprises a moment arm ring 95 received in the tension ring 91 and the tension ring 91 is secured to the moment arm ring 95 by radially deployed frangible pins 96. The bending ring 93 is secured to the moment arm ring by frangible screw connectors 97. The frangible connector assembly 90 permits the valve housings 20 and 50 to separate upon the application of bending or tension loads or a combination thereof, and its structure and operation is more fully discussed in my copending application Ser. No. 900,329. It will be understood that for the purposes of the invention herein, any means of frangibly connecting the valve housings 20 and 50 may be used, although the frangible connector assembly 90 is preferred.

As more fully explained in U.S. Pat. No. 3,921,656, the ball valve member 40 is provided with a spider 46 spanning the bore thereof, the ball valve member 70 is provided with a spider 76 spanning the bore thereof, and a trigger ball 78 is positioned between the spider members to hold the ball valve members 40 and 70 in the opened position shown in FIGS. 1 and 2. Upon separation of the valve housings 20 and 50, i.e. upon the release of the frangible connector assembly 90 due to the application of a bending or tension load or a combination thereof, the trigger ball 78 is released, and the ball valve members 40 and 70 are spring biased to their closed position. In particular, the ball valve members rotate until the extending portions 112 of the keys 111 ground against the stop surfaces 123 of the trunnion bearings 120, so that the ball valve members are limited from further rotation and held in their closed positions.

The ball valve mountings rotation limiting stops 100–103 provide for securing the ball valve members along their desired pivot axis and also for limiting the rotation of the ball valve members between their open and closed positions. It is a compact structure of relatively few parts. It is also a strong structure, and in particular, although the ball valve members and the valve housings may be fabricated of aluminum, the trunnion bearings and indicator shafts may be fabricated of a stronger material, such as stainless steel.

With reference to FIGS. 5 through 7, an alternative embodiment of the invention herein is illustrated. In general, it is characterized by the use of the spring tang as a portion of the rotation limiting mechanism. Accordingly, an indicator shaft 160 has a key 161 on the end thereof, but the key 161 does not protrude beyond the diameter of the shaft 160. The trunnion bearing 170 defines two arcuate slots 171 and 175 on its end surfaces, and the arcuate slot 170 has stop surfaces 172 and 173 and the arcuate slot 175 has stop surfaces 176 and 177. The ball valve member may be as described above and the tang end 142 of the spring 140 is received in the slot 43 of its trunnion stub shaft 42. The tang end 142 of the spring 140 is also received in the arcuate slots 171 and 175 on the ends of the trunnion bearing 170, wherein the spring tang end 142 grounds against the stops of the arcuate slots to limit the rotation of the ball valve member to between its open and closed position. The shaft 160 is received in the trunnion bearing 170 with its key 161 received in the slot 43 of the trunnion stub shaft 42, wherein the ball valve member and the indicator shaft rotate together. The shaft 160 is provided with a slot 162, the upper end thereof aligned with the key 162, whereby the shaft 160 provides an indicator function indicating whether the ball valve member is in its open or closed position. If the indicator function is not desired, the indicator shaft 160 may be eliminated from the structure, and the trunnion bearing 170 would simply define an opening for receiving the trunnion stub shaft of the ball valve member.

Accordingly, a self-closing breakaway valve assembly with improved ball valve member mountings including rotation limiting stops has been disclosed. It will be appreciated that the disclosure is illustrative and not limiting, and that changes can be made. For instance, the rotatable valve members need not be ball valves and the frangible connectors or the trigger means could be of different structure or configuration. Also, the trunnion bearings could be anchored in the housings in a different manner. These and other changes can be made by those skilled in the art without departing from the spirit and scope of the invention, which is limited only by the following claims.

I claim:
1. An improvement in self-closing breakaway valve assemblies of the type comprising:
   (A) a first valve housing having a first rotatable valve member rotatably mounted therein, said first valve housing and first rotatable valve member each having a bore formed therethrough, said bores being aligned when said first rotatable valve member is in an open position to provide a passage through said first valve housing, and said bores being misaligned to block the passage through said first valve housing when said first rotatable valve member is rotated to a closed position;
   (B) a second housing having a bore formed therethrough;
   (C) frangible means connecting said first valve housing and second housing with the bores formed therethrough in alignment; and
   (D) means holding the first rotatable valve member in its open position and releasing the first rotatable valve member upon separation of the first valve housing and second housing to permit the first rotatable valve member to rotate to its closed position,
wherein the first rotatable valve member has first and second trunnion shafts disposed along its desired pivot axis and wherein the improvement comprises valve member mountings with rotation limiting stops including:
   (1) first and second trunnion bearings defining openings respectively rotatably receiving the first and second trunnion shafts of the first rotatable valve member, the trunnion bearings fixedly mounted in the first valve housing to mount the first rotatable valve member for rotation about the desired pivot axis, the first trunnion bearing defining an arcuate slot having a stop surface; and
   (2) a first coil spring for spring biasing said first rotatable valve member to rotate from its open position to its closed position, the first coil spring deployed about the first trunnion shaft of the first rotatable valve member and having a first tang end secured to the first valve housing and a second tang end extending through the arcuate slot of the first trunnion bearing and engaged with the first trunnion shaft;
whereby when the first rotatable valve member is released, it rotates to its closed position where the second tang end of the coil spring grounds against the stop surface of the trunnion bearing to limit further rotation of the first rotatable valve member and to hold it at its closed position.

2. An improvement in self-closing breakaway valve assemblies as defined in claim 1 wherein the first trunnion bearing defines a second arcuate slot opposed from the first arcuate slot and also having a stop surface, the second tang end of the coil spring extending through both arcuate slots and grounding against both stops when the first rotatable valve member is in its closed position.

3. An improvement in self-closing breakaway valve assemblies as defined in claim 2 wherein the two arcuate slots are defined in the end of the first trunnion bearing adjacent the first rotatable valve member.

4. An improvement in self-closing breakaway valve assemblies as defined in claim 1 wherein the opening in the first trunnion bearing extends the length thereof and further comprising an indicator shaft received in the opening in the first trunnion bearing and engaged with the first trunnion shaft of the first rotatable valve member for rotation therewith, the end of the indicator shaft being exposed and having means thereon for indicating the position of the first rotatable valve member.

5. An improvement in self-closing breakaway valve assemblies as defined in claim 4 wherein the first trunnion shaft defines a slot in which the second tang end of the coil spring is engaged.

6. An improvement in self-closing breakaway valve assemblies as defined in claim 5 wherein the opening in the first trunnion bearing extends the length thereof and further comprising an indicator shaft received in the opening in the first trunnion bearing, one end of the indicator shaft having a key engaged in the slot of the first trunnion shaft above the second tang end of the coil spring so that the indicator shaft rotates with the first rotatable valve member, and the other end of the indicator shaft being exposed and having means thereon for indicating the position of the first rotatable valve member.

7. An improvement in self-closing breakaway valve assemblies as defined in claim 1 wherein the second trunnion bearing also defines an arcuate slot having a stop surface and further comprising:
   (3) a second coil spring for spring biasing said first rotatable valve member to rotate from its open position to its closed position, the second coil spring deployed about the second trunnion shaft of the first rotatable valve member and having a first tang end secured to the first valve housing and a second tang end extending through the arcuate slot of the second trunnion bearing and engaged with the second trunnion shaft;
whereby when the first rotatable valve member is released, it rotates to its closed position where the second tang ends of the first and second coil springs ground against the stop surfaces of the trunnion bearings to limit further rotation of the first rotatable valve member and to hold it at its closed position.

8. An improvement in self-closing breakaway valve assemblies as defined in claim 7 wherein the first and second trunnion bearings each define a second arcuate slot opposed from the first arcuate slot and also having a stop surface, the second tang ends of the coil springs extending through both arcuate slots of the respective trunnion bearing and grounding against both stops when the first rotatable valve member is in its closed position.

9. An improvement in self-closing breakaway valve assemblies as defined in claim 8 wherein the two arcuate slots are defined in the ends of the trunnion bearings adjacent the first rotatable valve member.

10. An improvement in self-closing breakaway valve assemblies as defined in claim 9 wherein the openings in the trunnion bearings extend the length thereof and further comprising two indicator shafts respectively received in the openings in the trunnion bearings and engaged with the trunnion shafts of the first rotatable valve member for rotation therewith, the ends of the indicator shafts being exposed and having means thereon for indicating the position of the first rotatable valve member.

11. An improvement in self-closing breakaway valve assemblies as defined in claim 5 wherein the trunnion shafts each define a slot in which the second tang ends of the coil springs are respectively engaged.

* * * * *